US012706879B2

(12) United States Patent
Liu

(10) Patent No.: US 12,706,879 B2
(45) Date of Patent: Aug. 11, 2026

(54) PERFORMANCE OPTIMIZATIONS AND TRAFFIC FLOW CONTROL FOR PACKET PROCESSING IN A FIREWALL

(71) Applicant: Fortinet, Inc., Sunnyvale, CA (US)

(72) Inventor: Liwu Liu, Cupertino, CA (US)

(73) Assignee: FORTINET, INC., Sunnyvale, CA (US)

( * ) Notice: Subject to any disclaimer, the term of this patent is extended or adjusted under 35 U.S.C. 154(b) by 79 days.

(21) Appl. No.: 18/824,720

(22) Filed: Sep. 4, 2024

(65) Prior Publication Data

US 2026/0067252 A1 Mar. 5, 2026

(51) Int. Cl.
*H04L 9/40* (2022.01)

(52) U.S. Cl.
CPC .......... *H04L 63/0236* (2013.01); *H04L 63/20* (2013.01)

(58) Field of Classification Search
CPC . H04L 63/0236; H04L 63/0272; H04W 28/02
See application file for complete search history.

(56) References Cited

U.S. PATENT DOCUMENTS 7,443,858 B1 * 10/2008 Cheriton ............ H04L 12/4645 370/397
11,228,603 B1 * 1/2022 Anand .................. G06N 20/00
2003/0069973 A1 * 4/2003 Ganesan ............ H04L 63/0227 709/246
2003/0140248 A1 * 7/2003 Izatt .................. H04L 63/0227 726/11
2004/0030927 A1 * 2/2004 Zuk .................... H04L 63/1441 709/224
2008/0267177 A1 * 10/2008 Johnson ............... H04L 63/162 370/389
2010/0218254 A1 * 8/2010 Gray, II ............. H04L 63/1408 726/23
2010/0278191 A1 * 11/2010 Gupta ................ H04L 63/1458 370/419
2014/0075539 A1 * 3/2014 Zuk .................... H04L 63/0227 726/13
2015/0326407 A1 * 11/2015 Sun .................... H04L 12/4666 370/392
2017/0374031 A1 * 12/2017 Jäger .................. H04L 63/0236
2019/0306118 A1 * 10/2019 Guo ........................ H04L 63/20
2022/0255906 A1 * 8/2022 Kim ................... H04L 63/0428
2023/0247055 A1 * 8/2023 Castro De Rosa ..... H04L 63/20 726/3

* cited by examiner

*Primary Examiner* — Ponnoreay Pich
(74) *Attorney, Agent, or Firm* — Jaffery Watson Hamilton & DeSanctis LLP

(57) ABSTRACT

Packet traffic flow control includes receiving a packet, by a first virtual machine network security appliance (VMNSA), and determining whether the packet is to be processed by a first path or a second path; in response to determining that the packet is to be processed by the first path, processing the packet by a first traffic flow controller (TFC) of the VMNSA, forwarding the packet by the first TFC to a first transmitter, and sending the packet by the first transmitter; and in response to determining that the packet is to be processed by the second path, processing the packet by the first TFC, forwarding the packet by the first TFC to a second TFC of the VMNSA, processing the packet by the second TFC, forwarding the packet by the second TFC to a second transmitter, and sending the packet by the second transmitter.

19 Claims, 7 Drawing Sheets

PERFORMANCE OPTIMIZATIONS AND TRAFFIC FLOW CONTROL FOR PACKET PROCESSING IN A FIREWALL

BACKGROUND

Various embodiments of the present disclosure generally relate to computer networks, network security and computing systems. In particular, some embodiments relate to improving processing of packets in a firewall in a computing system.

There are at least several challenges encountered in the field of packet processing in network processors. In ultra-high throughput computing environments various race conditions may arise, such as packets in a session utilizing receiver side scaling (RSS) including hashing traffic with 5-tuple or other elements often hit "hot" processors randomly in a localized temporary domain, and/or application configurations creates hot spots. When this happens, some processors may reach processing capacity and stop functioning normally for other duties. These negative effects includes starvation of services, starvation of network card transmit/receive (TX/RX) processing that causes network interface card (NIC) resetting, delaying of critical time-sensitive control packets (such as link aggregation control processing (LACP), address resolution protocol (ARP), and bidirectional forwarding detection (BFD)) where links and routes are timed out (such as BGP peers flapped, leading to loss of routing for fully covered networks), and/or clustering or loss of application heartbeats, which leads to disruptions of services. Race conditions may also arise in the use of receiving and transmission queues of network devices. A high data traffic volume can overflow a receive queue (RXQ) if not fetched quickly where critical control packets could be dropped if sharing a RXQ. Additionally, Internet Protocol Security (IPsec) tunnels are widely used. IPsec tunnels require cryptographic computations, and an intrusion prevention service (IPS) based on deep packet scanning takes a heavy toll on processor usage, since the cryptographic computation and packet content scanning operations against multiple signatures are both processing the full packet content in many rounds. These two operations are mostly performed by a dedicated security processor and content processor, however in a cloud computing environment these operations are performed by virtual processors requiring management overhead in a multiple instruction, multiple data (MIMD) framework.

SUMMARY

Systems and methods are described for improving packet processing technology in a software-implemented firewall (e.g., a virtual network processor (VNP)) in the context of computer networking and cloud computing. The present disclosure describes methods for performance optimization and traffic flow control in a virtual firewall.

In a virtualized and cloud computing environment, a high throughput virtual firewall, also called a virtual machine network security appliance (VMNSA) herein, lacks physical application specific integrated circuit (ASIC) support and thus utilizes provisioned virtual central processing units (vCPUs) to mimic physical network processor, security processor, and/or content processor hardware circuitry. In an embodiment, the VMNSA (running on one or more vCPUs) simulates the processing hardware and utilizes multi-stage parallel data plane development kit (DPDK) processing functions to perform systolic computing operations on vectors of packets. The packets in the "slow path" (e.g., these packets have no session-cached firewall verdict) are fed into a firewall software stack in the VMNSA to be processed using packet processing policies (which likely create new sessions), while packets in the session-matched "fast path" are processed and forwarded directly.

In an embodiment, the disclosed technology deals with conflicting traffic service conditions by dividing packet traffic flow into fast paths and slow paths and assigning dedicated resources (such as queues and vCPUs) to each path. Available vCPUs may be partitioned into two groups: "dumpster" and "protected". Packets of a random, non-uniform heat wave of slow path packets may be allocated to dumpster vCPUs where some packet drops are tolerated, while fast path, control path, and/or time-sensitive operating system (OS) daemons and certain kernel soft interrupt requests (SIRQs) may be allocated into the protected vCPUs.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
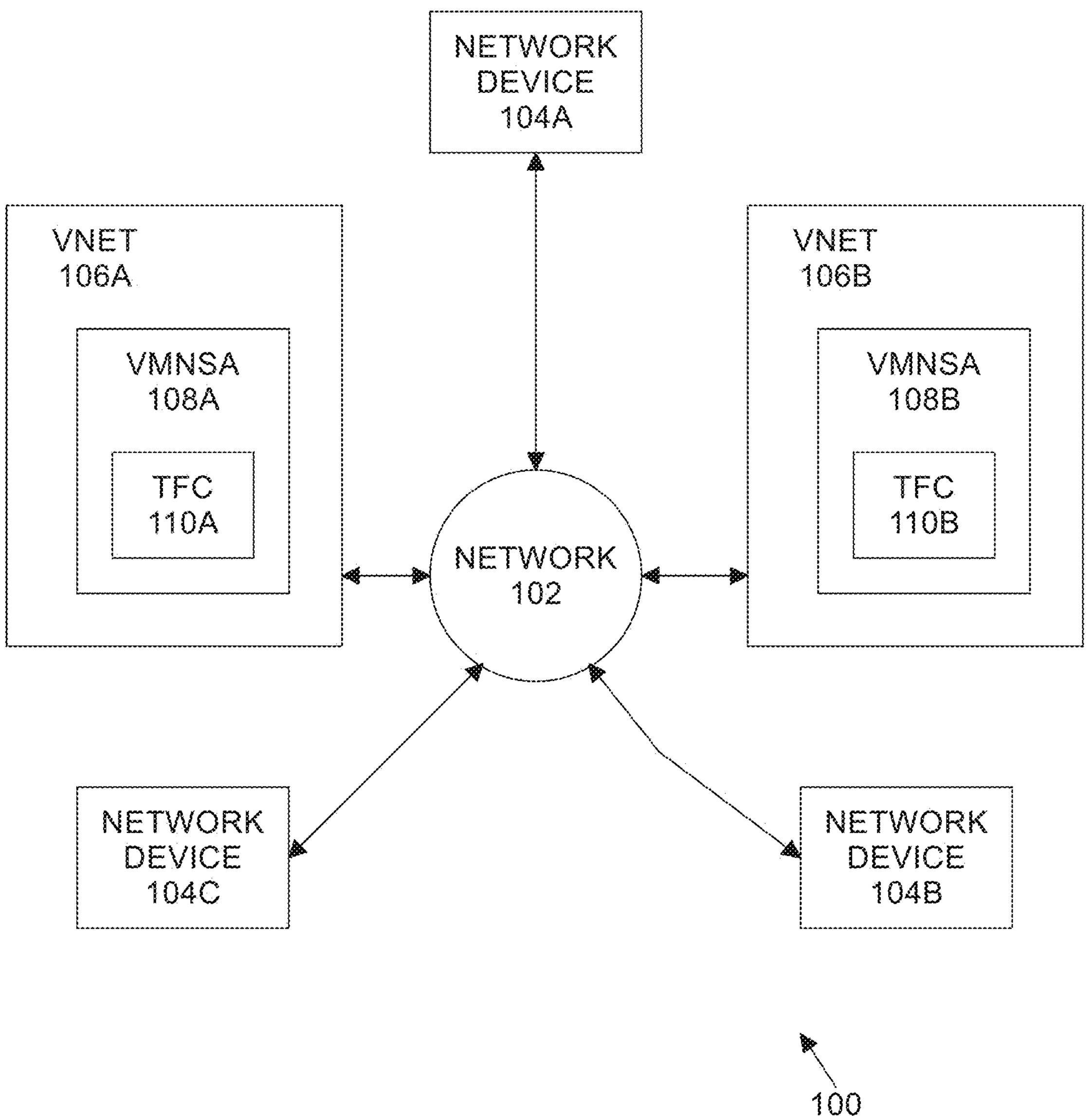
FIG. 1 illustrates a computing environment according to an embodiment of the present disclosure.

Embodiments of the technology disclosed herein diversify treatment for the following two categories of traffic flow: (1) normal Internet data traffic, which may have a high volume of traffic and packet flows, such as in telecommunications, where a certain amount of data loss is acceptable and latency is tolerated; and (2) control traffic, which may be lightweight, but cannot be dropped, and needs to be processed in sub-second latency. Embodiments provide for dedicated control receive queues (RXQs) and, to achieve real time processing, assign protected vCPU resources to guarantee timely processing of critical system features and networking features. Embodiments also provide just-in-time scheduling for less latency and better transmission performance. When multiple stages of packet processing operations share the same vCPU or other sources, the processing is ordered due to this dependency. Embodiments forward transmittable packets to hardware transmission queues as soon as possible. Thus, embodiments shrink packet processing latencies and mitigate the effects of bursty transmission. At the same time, maximizing the degree of possible parallel processing between vNIC transmission and vCPU processing leads to faster transmission for later packets by avoiding waiting for transmission of a previous batch of packets that have been scheduled just-in-time rather than queued. Further, embodiments may offload pass-through encapsulating security payload (ESP) sessions and denial of service (DOS) detection processing.

In the following description, numerous specific details are set forth to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

A "computer", "computer system" or "computing system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" or a "computing system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom (ASICs)). Based upon the disclosure provided herein, one of ordinary skill in the art will recognize a variety of network appliances that may be used in relation to different embodiments.

As used herein, a "network security appliance" (NSA) refers to a network appliance or network device that performs security processing operations (such as a firewall, for example), and a virtual machine network security appliance (VMNSA) refers to a NSA implemented in software running in a processor of a computing system.

As used herein, a "virtual network processor" (VNP) (also known as a virtual network function (VNF)) refers to a function in a computing system providing network processing operations. VNPs/VNFs are virtualized network services running on open computing platforms formerly carried out by proprietary, dedicated hardware technology. Common VNPs/VNFs include virtualized routers, firewalls, wide area network (WAN) optimization, and network address translation (NAT) services. Most VNPs/VNFs are run in virtual machines (VMs) on common virtualization infrastructure software.

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

FIG. 1 illustrates a computing environment according to an embodiment of the present disclosure. Computing environment 100 includes a plurality of virtual networks (vNets) 106 (e.g., 106*a* and 106*b*) that support multiple computing systems, processors, storage devices, and general processing units (GPUs), etc., performing backend enterprise business processing, such as for a small or medium business (SMB) corporation, a corporate department, a government branch office, etc. In the context of the network architecture of computing environment 100, one or more vNET 106 and/or one or more network devices 104 (e.g., network device 104*a*, network device 104*b*, and network device 104*c*) are coupled via a communication network 102. Communication network 102 may be any type of communication network known in the art. Those skilled in the art will appreciate that communication network 102 may be wireless network, a wired network, or a combination thereof that can be implemented as one of the various types of networks, such as an Intranet, a Local Area Network (LAN), a Wide Area Network (WAN), an Internet, and the like. Further, communication network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Access to communication network 102 by vNET 106*a* is intercepted and controlled by a virtual machine network security appliance (VMNSA) 108*a*, and access to communication network 102 by vNET 106*b* is intercepted and controlled by VMNSA 108*b*. Such intercepting is enabled by network path design, configuring network routing either locally or from a cloud computing environment and/or (software-defined networking (SDN). Further, each VMNSA may include one or more traffic flow controllers (TFCs), such as TFC 110*a* in VMNSA 108*a* and TFC 110*b* in VMNSA 108*b*. As used herein, a TFC determines how to process and forward packets.

Figure 2:
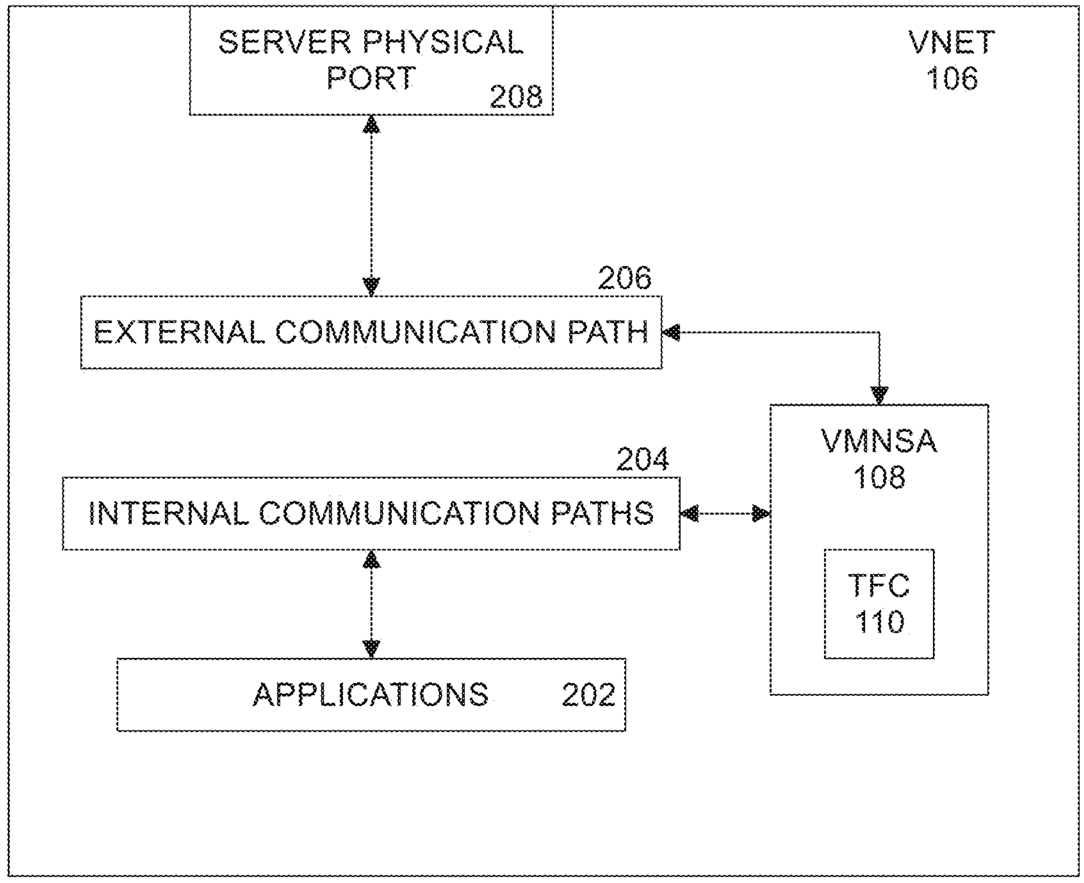
FIG. 2 illustrates a virtual network according to an embodiment of the present disclosure.

FIG. 2 illustrates a virtual network according to an embodiment of the present disclosure. The vNET 106 is an example of one or more vNET's 106*a* and 106*b*. The vNET 106 includes VMNSA 108 (e.g., VMNSA 108*a* and VMNSA 108*b* of FIG. 1) that performs various security-related data processing functions on data that crosses vNET boundary. Generally, VMNSA 108 may be any virtual machine that performs processing of data for security purposes. Such security purposes may include, but are not limited to, authentication, next-generation firewall protection, anti-trojan scanning, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Security (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Based upon the disclosure provided herein, one of ordinary skill in the art will recognize a variety of security processes that may be implemented in accordance with different embodiments. In some embodiments, VMNSA 108 may be a virtual implementation of a known network security appliance including, but not limited to, network gateways, virtual private network (VPN) appliances/gateways, unified threat management (UTM) appliances (e.g., the FORTIGATE family of network security appliances available from Fortinet, Inc.), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances). VMNSA 108 may include one or more TFCs 110. In an embodiment, a TFC may implement at least a part of packet processing and/or forwarding operations in VMNSA 108. In an embodiment, VMNSA 108 may be implemented as a high-availability clustering of two or more virtual machines, with each virtual machine capable of handling security processing for one or more virtual networks and/or subnets.

The vNET 106 includes any number of applications 202. Applications 202 may be any software application or virtual machine that is accessible via a communication network. Such applications may include, but are not limited to, reservation applications, payment applications, web server applications, virtual servers, a network appliance implemented as a virtual machine, and/or the like. Based upon the disclosure provided herein, one of ordinary skill in the art will recognize a variety of applications that may be used in relation to different embodiments. Applications 202 may be deployed in either a third-party server where server space is leased or a server maintained by the same entity that provides the applications.

VMNSA interception of traffic: Communications between one or more applications 202 within vNET 106 and network devices (e.g., network device 104*a*, 104*b*, 104*c*) external to vNET 106 are performed by sending data via a combination of one or more internal communication paths 204 and an external communication path 206 where the data passes through and is processed by VMNSA 108. Communications between applications 202 executing within vNET 106 are performed by sending data via internal communication paths 204 where the data passes through and is processed by VMNSA 108. Communications between any application 202 and network devices external to vNET 106 are performed by sending data via a combination of internal communication paths 204 and external communication path 206 where the data passes through and is processed by VMNSA 108. In operation, virtual machine network security appliance 116 concentrates traffic from various sources (e.g., internal communication path 112*a*, internal communication path 112*b*, and external communication path 114) and applies various policy rules and other security processes before forwarding the processed traffic to the designated recipients.

In an embodiment, internal communication paths 204 and external communication path 206 may be implemented by an operating system (OS) (e.g., Linux™) running on vNET 106. Based upon the disclosure provided herein, one of ordinary skill in the art will appreciate various mechanisms and/or features of the OS that may be used to configure internal communications paths 204 and external communication path 206. In physical networking, network planning and configurations enable data interception, in typical virtualized cloud computing environment the data interception is done through layer 2-4 SDN and a user defined routing (UDR) feature, etc.

Figure 3:
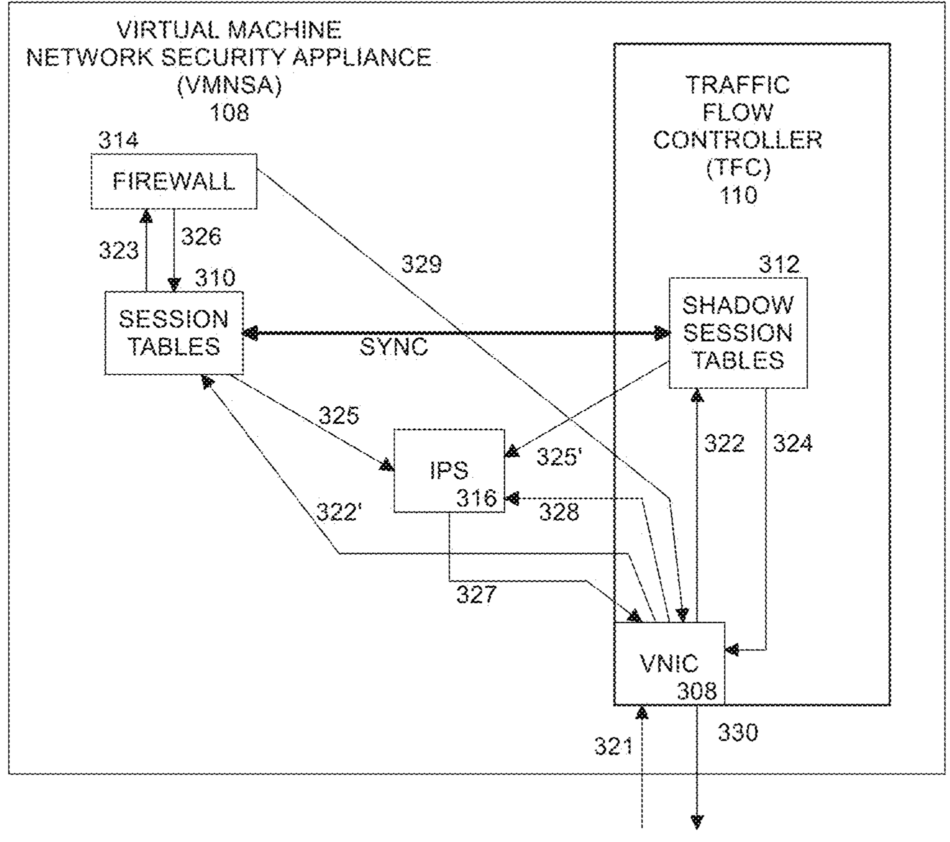
FIG. 3 illustrates a virtual machine network security appliance (VMNSA) according to an embodiment of the present disclosure.

FIG. 3 illustrates a virtual machine network security appliance (VMNSA) according to an embodiment of the present disclosure. The packet processing framework of VMNSA 108 consists of multiple stages of queues (of packets) and multiple processing functions. In an embodiment, each processing function may be performed by an affiliated virtual central processing unit (vCPU) of processing resources (e.g., of multi-core processor circuitry). Generally, packets are read from hardware receiving queues (HWRXQs) of network interface cards (NICs), the packets are processed by multiple stages of networking, firewalling and security processing as executed by an affiliated vCPU (also known as a virtual network processor (VNP)), and packets are then passed to hardware transmission queues (HWTXQs) for transmission. A packet may be received via flow 321 by virtual NIC (vNIC) 308, which accesses the packet and traffic flow controller (TFC) 110 searches a cache in shadow session tables 312 via flow 322 for a session associated with the packet.

In an embodiment using a VNP/data plane development kit (DPDK) framework, TFC 110 directly controls vNIC 308 either by removing a kernel default vNIC driver or mastering the kernel default vNIC driver, both with user space DPDK poll mode drivers. The TFC still always presents and/or exposes nominal kernel net devices to the default firewall software stack 314 so as to utilize the slow path of packet processing. Thus, depending on implementations by software vendors, TFC 110 has vNIC 308 exposed to the firewall software stack 314, and if TFC 110 is not enabled, the kernel default driver present vNIC 308 net devices to the firewall software stack 314.

The result of the search may be communicated back to vNIC 308 via flow 324. Shadow session tables 312 is a copy of session tables 310 and the two sets of session tables are continually synched (e.g., as shown by flow 322'). If there is no match (e.g., meaning the packet is not associated with any existing session from the shadow) at flow 324, then firewall 314 receives the packet via flow 322'. Most of time, flow 322' also reports a mismatch from the original session table 310, and only this case is described herein. Flow 323 processes the packet according to firewall policies. If firewall 314 can find a firewall policy that determines an "accept" result for the packet (e.g., based at least in part on priorities of firewall policies), and no intrusion prevention service (IPS) processing is designated for the packet, then the packet is forwarded to transmission via flows 329 and 330. If there is a firewall policy determining and "accept" result, the packet is not rejected by firewall 314, and IPS processing is designated for the packet, then the packet is forwarded via flow 325 to IPS 316 for IPS processing. At the same time, if firewall 314 does not reject the packet, a new session may be created and recorded in session tables 310 via flow 326 as well as in shadow session tables 312. When IPS 316 processing is complete, then the packet is forwarded via flow 327 to vNIC 308 for transmission via flow 330. Multiple TX/RX paths could co-exist herein, such as in a bifurcated mode in which certain traffic goes through a physical NIC net device, co-existing kernel vNIC net devices, or user space poll mode drivers (DPDK PMD), depending on various implementations by vendors. TFC 110 can choose which packets to be processed by the TFC and which packets are to go directly to firewall software stack 314.

Figure 4:
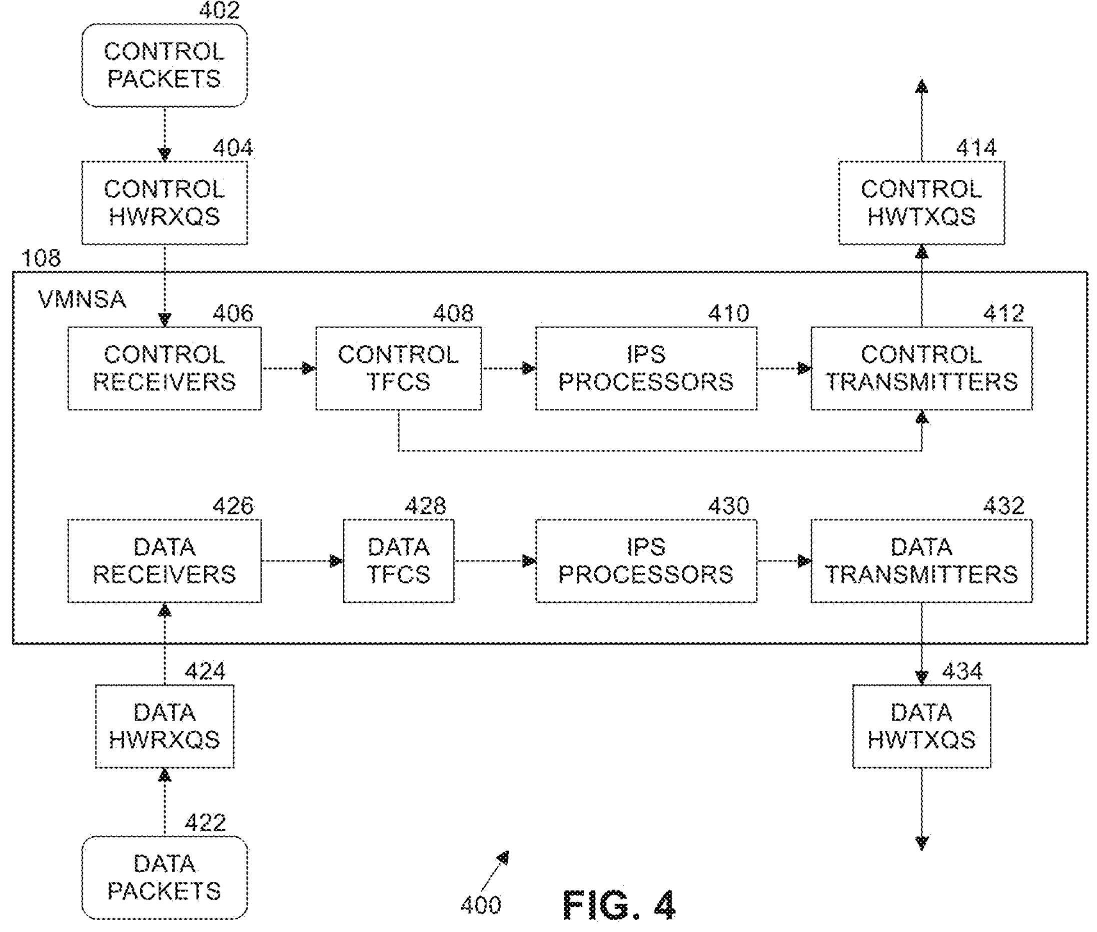
FIG. 4 illustrates stages of packet processing according to an embodiment of the present disclosure.

FIG. 4 illustrates stages of packet processing according to an embodiment of the present disclosure. Embodiments configure vNIC flow 321 rules for different types of traffic. In an embodiment, a global configuration of VMNSA 108 may determine which received packets are control packets to be protected. At a vNIC configuring phase, traffic flow rules may be added into vNIC firmware space where "protected control" traffic is configured to go to selected hardware receive queues (HWRXQs) and "data" traffic is configured to go to other HWRXQs. When receiving packets from a source, the vNIC processes all traffic flow 321 rules to correctly deliver packets to the appropriate queues. Then control receivers poll control HWRXQs, whereas data receivers poll data HWRXQs. Thus, ultra-high data volume will not be processed through control HWRXQs and control packets will not be missed.

As shown in FIG. 4, packet processing is split as follows. Control packets 402 may be stored in control HWRXQs 404. One of the control receivers 406 reads a control packet from a selected control HWRXQ 404. Control receiver 406 passes the control packet via a queue (not shown in FIG. 4) to a selected one of the control TFCs 408. Control TFC 408 determines if the control packet needs to be processed by a selected one of the IPS processors 410. If so, control TFC 408 forwards the control packet via a queue (not shown in FIG. 4) to IPS processor 410 for IPS processing, and the selected IPS processor then forwards the control packet via a queue (not shown in FIG. 4) to a selected one of the control transmitters 412. If not, control TFC 408 forwards the control packet directly to a selected one of the control transmitters 412. In either case, the selected control transmitter 412 forwards the control packet to a selected one of control HWTXQs 414 for forwarding to vNET 106. In one scenario, most control packets do not go through IPS processing.

Similarly, data packets 422 may be stored in data HWRXQs 424. One of the data receivers 426 reads a data packet from a selected data HWRXQ 424. Data receiver 426 passes the data packet via a queue (not shown in FIG. 4) to a selected one of the data TFCs 428. Data TFC 428 processes the data packet and forwards the data packet via a queue (not shown in FIG. 4) to IPS processor 430 for IPS processing, and the selected IPS processor then forwards the data packet via a queue (not shown in FIG. 4) to a selected one of the data transmitters 432. The selected data transmitter 432 forwards the data packet to a selected one of data HWTXQs 434 for forwarding to vNET 106.

There may be any number of control HWRXQs 404, control receivers 406, control TFCs 408, IPS processors 410, control transmitters 412, control HWTXQs 414, data HWRXQs 424, data receivers 426, data TFCs 428, IPS processors 430, data transmitters 432, and data HWTXQs 434. Furthermore, control receivers 406, control TFCs 408, IPS processors 410, control transmitters 412, data receivers 426, data TFCs 428, IPS processors 430, and data transmitters 432 may be executed by any one or more affiliated vCPUs in VMNSA 108. In an embodiment, a control TFC 408 may be executed by a different vCPU than a data TFC 428. In an embodiment, an IPS processor (e.g., IPS processor 410 or IPS processor 430) may be executed by a different vCPU than a corresponding control TFC 408 or data TFC 428, respectively.

Figure 5:
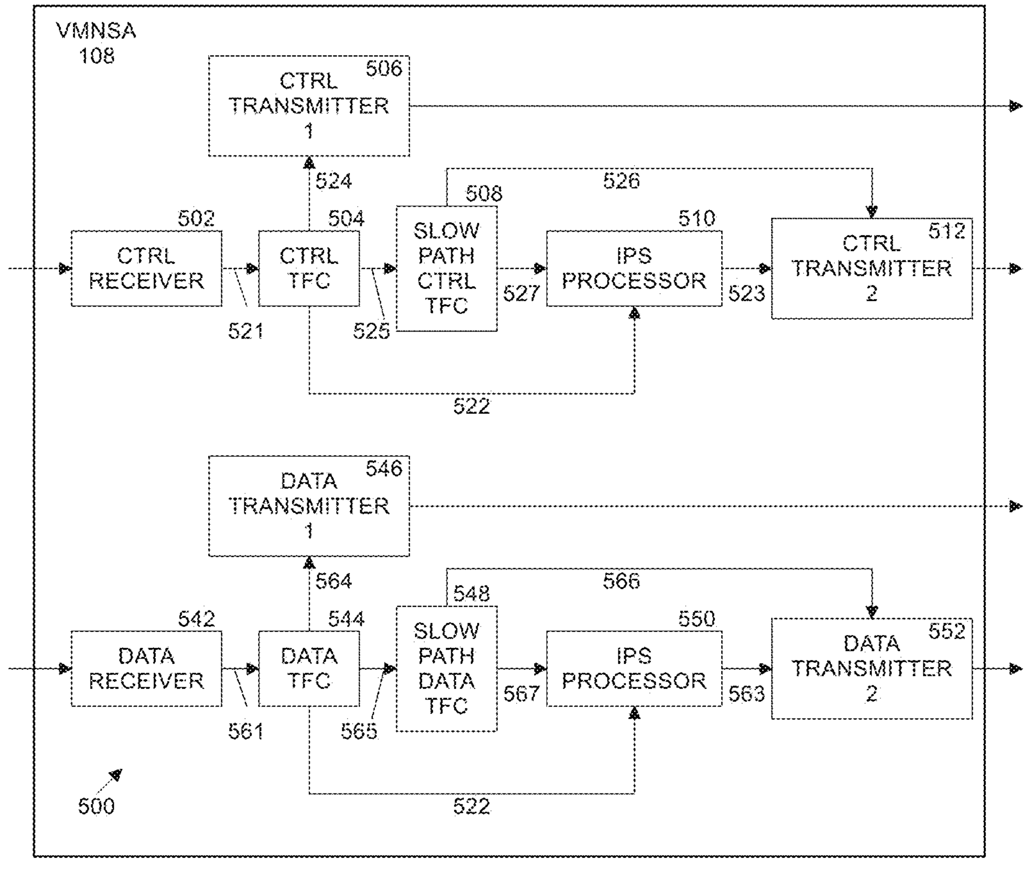
FIG. 5 illustrates fast path and slow path processing of packets according to an embodiment of the present disclosure.

FIG. 5 illustrates fast path and slow path processing 500 of packets according to an embodiment of the present disclosure. In an embodiment, the traffic flow controller stages (e.g., control TFCs 408 and data TFCs 428), may each be extended to a fast path TFC and a slow path TFC, with each of fast path TFC and slow path TFC being able to define its own vCPU affinity in vNET 106. Thus, control packets may be processed differently than data packets and by different vCPUs in VMNSA 108, thereby improving overall system latency. In an ultra-high packet per second computing environment, slow path data packets may be occasionally dropped and the affiliated vCPU may be classified as an "unsafe" vCPU (e.g., due to the load). In one scenario, a vCPU processing "mismatched slow" data packets may use 10 to 100 times the processing resources than a vCPU processing a "matched fast path" data packet. These vCPUs being used to process "fast path" data packets may be classified as "safe" vCPUs. In a scenario where a slow path TFC is co-affiliated (e.g., for a case where a customer of the server desires a zero-configuration implementation), or in the scenario of mixed IPS processing of both control packets and data packets, there is a heavy vCPU processing cost, and in an embodiment fast path packets without IPS requirements may be sent as soon as possible (e.g., just in time), thus shortening latency. Round trip latency is a determining factor of TCP performance, and because in embodiments deep queuing of multiple stages is used and vector processing of multiple packets is performed simultaneously, an extra transmitter (e.g., transmitter 1) is added to the control and data path design shown in FIG. 5.

In an embodiment, the fast path TFC may be used for normal firewalling and defer the slow path traffic to slow path TFC by queueing, and the IPS processor may be used for very slow processing of unified threat management (UTM) processing, such as anti-virus, anti-phishing, etc.

For each incoming packet, in an embodiment the following processing may be performed. VMNSA 108 determines if the packet is a control packet 402 or a data packet 422. If the packet is a control (CTRL) packet 402, a control receiver 502 gets the control packet from a HWRXQ (e.g., control HWRXQ 404) from vNIC 308 and forwards the control packet via flow 521 to a queue (not shown in FIG. 5) coupled to a control TFC 504. Control TFC 504 gets the control packet from the queue, parses protocol headers of the control packet and extracts the key data from the control packet. Control TFC 504 searches one or more caches in the shadow session table 312 (not shown in FIG. 5) with the key data. If a match is detected (e.g., indicating that the control packet is associated with an existing session), the matched session entry in shadow session table 312 indicates further processing. Herein, this is called a fast path for packet processing. If the matched session entry indicates that IPS processing should be performed for this control packet, control TFC 504 forwards the control packet via flow 522 to a queue (not shown in FIG. 5) coupled with IPS processor 510. IPS processor 510 gets the control packet from the queue, performs IPS processing on the control packet, and then forwards the control packet via flow 523 to a queue coupled to control transmitter 2 512. Control transmitter 2 512 then sends the control packet. If the matched session entry indicates that IPS processing should not be performed for this control packet, control TFC 504 forwards the control packet via flow 524 to a queue (not shown in FIG. 5) coupled with control transmitter 1 506. Control transmitter 1 506 then sends the control packet. Thus, in an embodiment, the fast path of processing for control packets includes control receiver 502, control TFC 504, optionally IPS processor 510 and control transmitter 2 512, and control transmitter 1 506. If no IPS processing is designated, then the fast path for control packets includes only control receiver 502, control TFC 504 and control transmitter 1 506.

If a match is not detected (e.g., indicating that the control packet is not associated with an existing session), the matched session entry in shadow session table 312 indicates further processing. Herein, this is called a slow path for control packet processing. In this case, control TFC 504 forwards the control packet via flow 525 to a queue (not shown in FIG. 5) coupled to slow path control TFC 508. Next, slow path control TFC 508 processes the control packet in a system kernel default networking stack within slow path control TFC 508. Slow path control TFC 508 attempts to match the control packet to one or more kernel session tables 310. This matching attempt usually fails, because the shadow session table has already previously not been matched (e.g., the shadow session table is typically almost identical to the kernel session table as they are synchronized, therefore if an entry is missing in the shadow session table this typically means the entry is missing in original session table). If a match is detected (which is typically unlikely), slow path control TFC 508 forwards the control packet via flow 526 to control transmitter 2 512 or via flow 527 to IPS processor 510, depending on parsing of headers in the control packets to form session search key binaries. This may include Layer 2 port identifiers (IDs), Layer 2 vLAN and transport information, and Layer 3 and Layer4 and application layers combined.

If a match is not detected (e.g., the usual case), slow path control TFC 508 directs firewall policies of firewall 314 to generate a verdict of the firewall checking actions. If the firewall verdict is that the control packet is rejected, the control packet is dropped by VMNSA 108. If the firewall verdict is that the control packet is accepted, VMNSA 108 creates a new session entry for the control packet in a session table 310, sends a message to a session synchronization service (not shown in FIG. 5) to create a corresponding new entry in a shadow session table 312, and performs other processing on the control packet, such as metering, checking source network address translation (NAT), checking destination NAT, checking virtual local area networking (VLAN) data, etc. If slow path control TFC 508 is configured to indicate IPS processing for the control packet, then slow path control TFC 508 forwards the control packet via flow 527 to a queue (not shown in FIG. 5) coupled to IPS processor 510. IPS processor 510 gets the control packet from the queue, performs IPS processing on the control packet, and then forwards the control packet via flow 523 to a queue coupled to control transmitter 2 512. Control transmitter 2 512 then sends the control packet. If slow path control TFC 508 is not configured to indicate IPS processing for the packet, slow path control TFC 508 forwards the control packet via flow 526 to a queue (not shown in FIG. 5) coupled with control transmitter 2 512. Control transmitter 2 512 then sends the control packet. Thus, in an embodiment, the slow path of control packet processing includes control receiver 502, control TFC 504, slow path control TFC 508, optionally IPS processor 510, and control transmitter 2 512. If no IPS processing is designated, then the slow path for control packets includes only control receiver 502, control TFC 504, slow path control TFC 508, and control transmitter 2 512.

When a control transmitter (e.g., control transmitter 1 506 or control transmitter 2 512) gets a control packet, the transmitter performs post-processing on the control packet and sends the control packet to a HWTXQ (e.g., control HWTXQ 414). The NIC hardware (e.g., an ASIC) associated with vNIC 308 then schedules control packets buffered in a HWTXQ and transmits the control packets to media.

If the packet is a data packet 422, a data receiver 542 gets the data packet from a HWRXQ (e.g., data HWRXQ 424) from vNIC 308 and forwards the data packet via flow 561 to a queue (not shown in FIG. 5) coupled to a data TFC 544. Data TFC 544 gets the data packet from the queue, parses protocol headers of the data packet and extracts the key data from the data packet. Data TFC 544 searches one or more caches in the shadow session table 312 (not shown in FIG. 5) with the key data. If a match is detected (e.g., indicating that the data packet is associated with an existing session), the matched session entry in shadow session table 312 indicates further processing. Herein, this is called a fast path for data packet processing. If the matched session entry indicates that IPS processing should be performed for this data packet, data TFC 544 forwards the data packet via flow 562 to a queue (not shown in FIG. 5) coupled with IPS processor 550. IPS processor 550 gets the data packet from the queue, performs IPS processing on the data packet, and then forwards the data packet via flow 563 to a queue coupled to data transmitter 2 552. Data transmitter 2 552 then sends the data packet. If the matched session entry indicates that IPS processing should not be performed for this data packet, data TFC 544 forwards the data packet via flow 564 to a queue (not shown in FIG. 5) coupled with data transmitter 1 546. Data transmitter 1 546 then sends the data packet. Thus, in an embodiment, the fast path of processing for data packets includes data receiver 542, data TFC 544, optionally IPS processor 550 and data transmitter 2 552, and data transmitter 1 546. If no IPS processing is designated, then the fast path for data packets includes only data receiver 542, data TFC 544 and data transmitter 1 546.

If a match is not detected (e.g., indicating that the data packet is not associated with an existing session), the matched session entry in shadow session table 312 indicates further processing. Herein, this is called a slow path for data packet processing. In this case, data TFC 544 forwards the data packet via flow 565 to a queue (not shown in FIG. 5) coupled to slow path data TFC 548. Next, slow path data TFC 548 processes the data packet in a system kernel default networking stack within slow path data TFC 548. Slow path data TFC 548 attempts to match the data packet to one or more kernel session tables 310. This matching attempt usually fails, because the shadow session table has already previously not been matched (e.g., the shadow session table is typically almost identical to the kernel session table as they are synchronized, therefore if an entry is missing in the shadow session table this typically means the entry is missing in original session table). If a match is detected (which is typically unlikely), slow path data TFC 548 forwards the data packet via flow 566 to data transmitter 2 552 or via flow 567 to IPS processor 510, depending on parsing of headers in the data packets to form session search key binaries. This may include Layer 2 port identifiers (IDs), Layer 2 vLAN and transport information, and Layer 3 and Layer4 and application layers combined.

If a match is not detected (e.g., the usual case), slow path data TFC 548 directs firewall policies of firewall 314 to generate a verdict of the firewall checking actions. If the firewall verdict is that the data packet is rejected, the data packet is dropped by VMNSA 108. If the firewall verdict is that the data packet is accepted, VMNSA 108 creates a new session entry for the data packet in a session table 310, sends a message to slow path data TFC 548 to create a corresponding new entry in a shadow session table 312, and performs other processing on the data packet, such as metering, checking source network address translation (NAT), checking destination NAT, checking virtual local area networking (VLAN) data, etc. If slow path data TFC 548 is configured to indicate IPS processing for the packet, then slow path data TFC 548 forwards the data packet via flow 567 to a queue (not shown in FIG. 5) coupled to IPS processor 550. IPS processor 550 gets the data packet from the queue, performs IPS processing on the data packet, and then forwards the data packet via flow 563 to a queue coupled to data transmitter 2 552. Data transmitter 2 552 then sends the packet. If slow path data TFC 548 is not configured to indicate IPS processing for the data packet, slow path data TFC 548 forwards the data packet via flow 566 to a queue (not shown in FIG. 5) coupled with data transmitter 2 552. Data transmitter 2 552 then sends the data packet. Thus, in an embodiment, the slow path of data packet processing includes data receiver 542, data TFC 544, slow path data TFC 548, optionally IPS processor 510, and data transmitter 2 552. If no IPS processing is designated, then the slow path for data packets includes only data receiver 542, data TFC 544, slow path data TFC 548, and data transmitter 2 552. In an embodiment, processing of the data packet by the fast path is much faster than processing of the data packet by the slow path.

When a data transmitter (e.g., data transmitter 1 546 or data transmitter 2 552) gets a data packet, the transmitter performs post-processing on the data packet and sends the packet to a HWTXQ (e.g., data HWTXQ 434). The NIC hardware (e.g., an ASIC) associated with vNIC 308 then schedules packets buffered in a HWTXQ and transmits the packets.

In an embodiment, the slow path that fails to match the packet to one or more kernel session tables 310 goes through a set of policies and creates a new session entry, and finally sends the packet to a HWTXQ (e.g., the "networking stack") is in kernel space, at a soft-IRQ level that preempts user processes. This defines the slow path for packet processing. When the slow path TFC path uses approximately 100% of the capacity of the affiliated vCPU and starts to drop packets, the affiliated vCPU may be designated as "unsafe" for protected control data. Sometimes, reaching approximately 100% capacity occurs during other processing, such as heavy IPS processing, handling IPsec tunnels, etc. However, in embodiments, delivery of control packets is guaranteed. In a tele-communications computing environment, the ratio of slow path to fast path packet processing may approximate 1:10, but the processing load of each slow path packet may be 10 to 100 times more than a fast path packet.

In an embodiment, processing for control receiver 502, control TFC 504, slow path control TFC 508, IPS processor 510, control transmitter 1 506, control transmitter 2 512, data receiver 542, data TFC 544, data slow path TFC 548, IPS processor 550, data transmitter 1 546, and/or data transmitter 2 552, may be mapped into available vCPU sets in processing circuitry in VMNSA 108 (such as cloud vendor provisioned vCPU cores according to the size/shape/class of Infrastructure as a Service (IaaS) offerings). In an embodiment, in a default zero-configuration scenario, these components may be mapped to any available vCPU.

Use of the described pipeline of VMNSA 108 in a looping manner may help shorten the latency of fast path packet processing when the firewall verdict is to send the packet directly to transmitter 1 (either control transmitter 1 506 or data transmitter 1 546), because the round of transmitter 1 forwarding the packet to the NIC hardware associated with vNIC 308, and the scheduling and post-processing and transmitting to media by NIC ASIC may be performed in parallel with vCPU processing of the MIMD stages. In an embodiment, two rounds of transmitter 1 and transmitter 2 (e.g., control transmitter 1 506 and control transmitter 2 512, or data transmitter 1 546 and data transmitter 2 552) may share the same incoming queue.

In an embodiment, there may be availability (although not without incurring additional overhead) to configure vCPU affinities (e.g., affiliations). In some cases, a default "all-to-all" (mapping VMNSA functions to vCPUs) balanced zero-configuration setting may be used. In all configurations, the use of "just-in-time" scheduling is intended to decrease in-system queuing latency (not processing latency, although queuing latency equals function waiting time plus the number of packets times the processing time for each packet) of each packet, where packets are sent out to the vNIC ASIC as soon as possible, trying to avoid latency from vCPU-VMNSA function co-affiliating dependence without breaking multiple instruction multiple data (MIMD) assumptions, and improves TX efficiency for later on packets.

In an embodiment, when an OS of VMNSA 108 boots, VMNSA 108 may read configuration settings for packet processing from a configuration database. In one scenario, a system administrator of VMNSA 108 may modify the configuration settings in runtime via command line interface (CLI), a daemon, or a kernel module. This may involve sending messages to daemons, restarting daemons, or restarting VMNSA 108.

In an embodiment, VMNSA 108 may include capabilities for offloading for encapsulating security payload (ESP) sessions and denial of service (DOS) detection processing.

In an embodiment, one or more new commands may be used to manage VMNSA 108. A new command may be used to specify what is the "protected" control traffic flow. For example:

```
config dpdk global
set protects "udp/3784 eth/0x8891 tcp/10443
end
```

In this example, the config command specifies UDP/3784 (BGP heartbeat BFD), eth/0x8891 (FortiOS HA L2 heartbeat), TCP/10443 (Azure https load balancer probing or auto-scaling-set with port 10443) as control traffic.

In an embodiment, VMNSA 108 may be set to switch from all-traffic-hash-to-all-HWRXQ to a bifurcated mode. This permits selected data to bypass TFC 504 MIMD, while at the same time there are certain traffic types that cannot gain a benefit from TFC 504 MIMD and then the data can go directly via a kernel default path rather than using TFC 504 as intermediate proxy).

In an embodiment, VMNSA 108 may utilize a flow mode to split data packets from control packets. In this case, one portion of HWRXQs is dedicated to receiving control packet traffic specified by the config command. Assuming control packet traffic is light, VMNSA 108 may guarantee no packets are dropped and all processed in real-time for light-weighted control traffic. Normal data packet traffic may be configured to enter another portion of the HWRXQs. VMNSA 108 may determine which data packet traffic is to be processed by TFC 504 depending on if such processing would result in improved performance. In an embodiment, such processing may include TCP/UDP/IP forwarding, IPSec terminating, IP-in-IP tunnel terminating, VLAN (e.g., VXLAN) terminating, etc.).

A new command may be used to specify vCPUs used for processing of both control packets and data packets, and for the fast path and slow path of data. For example:

```
config dpdk cpus
  set vnpsp-cpus "10-20"
end
```

This defines the vCPU set that performs slow path processing, where vCPU processing may push a CPU to approximately 100% capacity and permits packet drops (of normal data traffic). This also helps to manipulate states in a way to shorten latencies. In a generic sense, this depends on traffic patterns, however, the slow path could be a bottleneck in many usage scenarios. But for some different and special traffic patterns where IPS processing and/or cryptographic computation is performed, processing of other features (such as UTM, IPS, Anti-Virus, etc.) could consume a majority of vCPU processing time, where the VNP MIMD computing configuration may be adapted to retrofit to the traffic pattern.

A new command may be used to assign a critical daemon to a selected "protected" vCPU. For example:

```
Conf sys global
Set bfd-affinity 0xffffff00000
end
```

The above command puts the BFD (heartbeat for the BGP routing protocol) into a selected vCPU that is supposed to be "protected".

Figure 6:
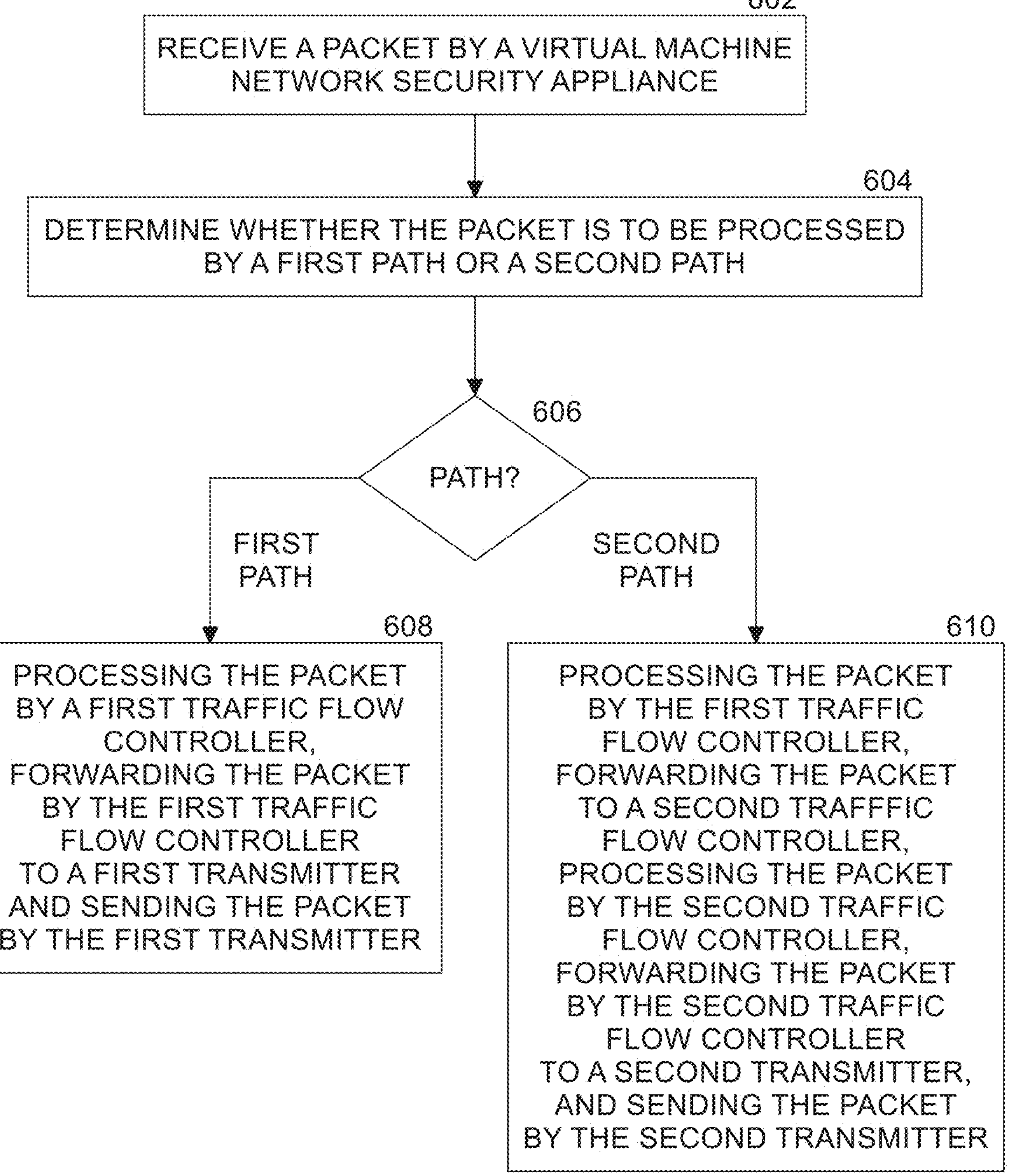
FIG. 6 illustrates processing of packets according to an embodiment of the present disclosure.

FIG. 6 illustrates processing 600 of packets according to an embodiment of the present disclosure. At block 602, a packet may be received by a virtual machine network security appliance (e.g., VMNSA 108) of a computing system. At block 604, the virtual machine network security processor determines whether the packet is to be processed by a first path (e.g., a fast path) or by a second path (e.g., a slow path). If the selected path at block 606 is the first path (e.g., fast path), then at block 608, the packet is processed by a first traffic flow controller (e.g., control TFC 504 when the packet is a control packet or data TFC 544 when the packet is a data packet) of the virtual machine network security appliance, forwarded by the first traffic flow controller to a first transmitter (e.g., control transmitter 1 506 when the packet is a control packet or data transmitter 1 546 when the packet is a data packet), and the packet is sent by the first transmitter.

If the selected path at block 606 is the second path (e.g., slow path), then at block 610, the packet is processed by the first traffic controller (e.g., control TFC 504 when the packet is a control packet or data TFC 544 when the packet is a data packet), forwarded by the first traffic flow controller to a second traffic flow controller (e.g., slow path control TFC 508 when the packet is a control packet or slow path data TFC 548 when the packet is a data packet), processed by the second traffic flow controller, forwarded by the second traffic flow controller to a second transmitter (e.g., control transmitter 2 512 when the packet is a control packet or data transmitter 2 552 when the packet is a data packet), and the packet is sent by the second transmitter.

The technology of the packet processing system described herein provides at least several advantages and technical improvements over existing computing systems. Packets in existing approaches are typically processed in a combined VNP stage, however in the technology disclosed herein a batch (e.g., vector) of packets may be processed (rather than a single packet) so as to pass through a packet finite state machine (FSM), where many dedicated VNP services are applied, until each packet reaches its outgoing state, thereby sharing the processing overhead. Packets of the slow path are directly pushed into the same vCPU core, whereas packets of the fast path have to wait for packet processing completion. By adding the slow path VNP stage, the fast path VNP stage may push/defer the slow path packets into a queue for the slow path VNP, and the fast path VNP may continue FSM looping, and slow path VNP processing may be affiliated with different individual vCPUs. Furthermore, fast path packets may be forwarded to a next stage such as transmitter 1 much earlier than in pre-existing pipelines, thereby shrinking latency; while at the same time, when the slow path processing burns out affiliated vCPU's to full 100% and starts dropping packets, this scenario will not affect un-affiliated vCPU's where protected traffic is being processed.

While in the context of the example described with reference to the flow diagrams of this disclosure, a number of enumerated blocks are included, it is to be understood that examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause one or more processing resources (e.g., one or more general-purpose and/or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a tangible non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or general-purpose computer hardware to execute the code contained therein. An apparatus for practicing various embodiments of the present disclosure may involve one or more computer systems (e.g., physical and/or virtual servers, physical and/or virtual network security appliances) (or one or more processors within a single computer system) and storage systems containing or having network access to computer program(s) coded in accordance with various methods described herein, and the method steps associated with embodiments of the present disclosure may be accomplished by modules, routines, subroutines, or subparts of a computer program product.

Figure 7:
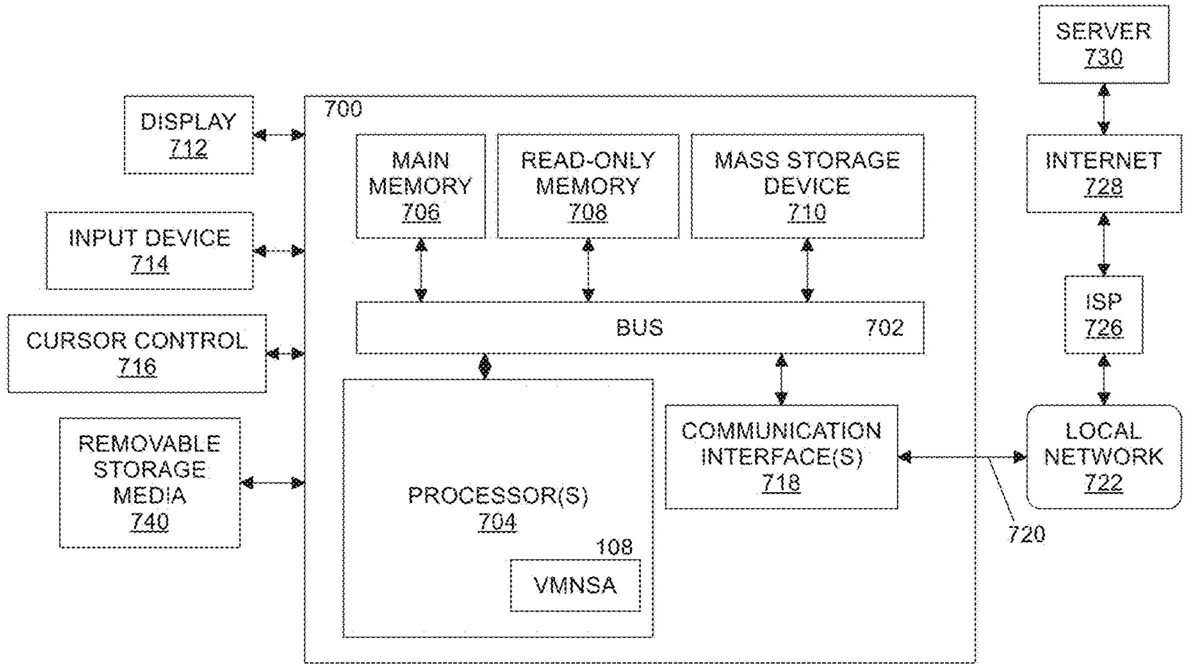
FIG. 7 illustrates an example computing system in which or with which embodiments of the present disclosure may be utilized.

FIG. 7 illustrates an example computing system in which or with which embodiments of the present disclosure may be utilized. In an embodiment, computing system 700 is an example of vNET 106. FIG. 7 shows a block diagram that illustrates a computing system 700 in which or with which an embodiment of the present disclosure may be implemented. Computing system 700 may be representative of a computer server (e.g., a cloud server in a cloud computing environment such as vNET 106) on which a VMNSA 108 is running. Notably, components of computing system 700 described herein are meant only to exemplify various possibilities. In no way should the example computing system 700 limit the scope of the present disclosure. In the context of the present example, computing system 700 includes a bus 702 or other communication mechanism for communicating information, and one or more processing resources (e.g., one or more hardware processors 704) coupled with bus 702 for processing information. Hardware processors 704 may include, for example, one or more general purpose microprocessors available from one or more current or future microprocessor manufactures (e.g., Intel Corporation, Advanced Micro Devices, Inc., and/or the like) and/or one or more special purpose processors (e.g., graphics processing units (GPUs), network processors (NPs), and/or accelerators or co-processors). In some examples, one or more processing resources may be part of an application specific integrated circuit (ASIC)-based security processing unit (e.g., the FORTISP family of security processing units available from Fortinet, Inc. of Sunnyvale, CA).

Computing system 700 also includes a main memory 706, such as a machine-readable random-access memory (RAM) or other dynamic storage device, coupled to bus 702 for storing information and instructions (e.g., VMNSA 108) to be executed by processor(s) 704. Main memory 706 also may be used for storing temporary variables or other intermediate information during execution of instructions to be executed by processor(s) 704. Such instructions, when stored in non-transitory storage media accessible to processor(s) 704, render computing system 700 into a special-purpose machine that is customized to perform the operations specified in the instructions.

Computing system 700 further includes a read only memory (ROM) 708 or other static storage device coupled to bus 702 for storing static information and instructions (e.g., VMNSA 108) for processor(s) 704. A storage device 710, e.g., a magnetic disk, optical disk or flash disk (made of flash memory chips), is provided and coupled to bus 702 for storing information and instructions.

Computing system 700 may be coupled via bus 702 to a display 712, e.g., a cathode ray tube (CRT), Liquid Crystal Display (LCD), Organic Light-Emitting Diode Display (OLED), Digital Light Processing Display (DLP) or the like, for displaying information to a computer user. An input device 714, including alphanumeric and other keys, is coupled to bus 702 for communicating information and command selections to processor(s) 704. Another type of user input device is cursor control 716, such as a mouse, a trackball, a trackpad, or cursor direction keys for communicating direction information and command selections to processor(s) 704 and for controlling cursor movement on display 712. The input device typically has two degrees of freedom in two axes, a first axis (e.g., x) and a second axis (e.g., y), that allows the device to specify positions in a plane.

Removable storage media 740 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computing system 700 may implement the techniques described herein using customized hard-wired logic, one or more ASICs or field programmable gate arrays (FPGAs), firmware or program logic which in combination with the computer system causes or programs computing system 700 to be a special-purpose machine. According to one embodiment, the techniques herein are performed by computing system 700 in response to processor(s) 2004 executing one or more sequences of one or more instructions (e.g., VMNSA 108) contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "storage media" as used herein refers to any non-transitory machine-readable media that store data or instructions that cause a machine to operate in a specific fashion. Such storage media may comprise non-volatile media or volatile media. Non-volatile media includes, for example, optical, magnetic or flash disks, such as storage device 710. Volatile media includes dynamic memory, such as main memory 706. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor(s) 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieve and execute the instructions. The instructions received by main memory 706 may optionally be stored on storage device 710 either before or after execution by processor(s) 704.

Computing system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection- to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computing system 700, are example forms of transmission media. Note that if traffic "terminates", that is, targets to the VMNSA OS itself, packets shall be processed by the slow path. Although there are cases such as IPSEC/IP-in-IP/VXLAN tunnel terminating, after some calculating of tunnel encapsulation/de-capsulation, traffic will still be mostly processed as fast path.

Computing system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor(s) 704 as it is received, or stored in storage device 710, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

receiving a packet, by a virtual machine network security appliance in a computing system, and determining whether the packet is to be processed by a first path or a second path;

in response to determining that the packet is to be processed by the first path, processing the packet by a first traffic flow controller of the virtual machine network security appliance, forwarding the packet by the first traffic flow controller to a first transmitter, and sending the packet by the first transmitter; and in response to determining that the packet is to be processed by the second path, processing the packet by the first traffic flow controller, forwarding the packet by the first traffic flow controller to a second traffic flow controller of the virtual machine network security appliance, processing the packet by the second traffic flow controller, forwarding the packet by the second traffic flow controller to a second transmitter, and sending the packet by the second transmitter.

2. The method of claim 1, wherein in response to determining that the packet is to be processed by the first path, sending the packet by the first traffic flow controller to an intrusion prevention service (IPS) processor, and performing IPS processing on the packet by the IPS processor and sending the packet to the second transmitter.

3. The method of claim 1, wherein in response to determining that the packet is to be processed by the second path, sending the packet by the second traffic flow controller to an intrusion prevention service (IPS) processor, and performing IPS processing on the packet by the IPS processor and sending the packet to the second transmitter.

4. The method of claim 2 or 3, wherein the IPS processing comprises unified threat management processing on the packet.

5. The method of claim 1, wherein processing of the packet by the first path is faster than processing of the packet by the second path.

6. The method of claim 1, wherein the packet is a control packet.

7. The method of claim 1, wherein the packet is a data packet.

8. The method of claim 1, comprising receiving the packet by a receiver of the virtual machine network security appliance from a hardware receive queue.

9. The method of claim 1, wherein sending the packet comprises forwarding the packet to a hardware transmit queue.

10. The method of claim 1, wherein the first traffic flow controller and the second traffic flow controller are executed by different virtual central processing units of the computing system.

11. The method of claim 1, wherein the first traffic flow controller performs firewall processing on the packet.

12. The method of claim 1, wherein the second traffic flow controller directs firewall policies of a firewall of the virtual machine network security appliance to generate a verdict determining dropping of the packet when the packet is a control packet.

13. A non-transitory, machine-readable medium storing instructions, which when executed by one or more processing resources, cause the one or more processing resources to:

receive a packet, by a virtual machine network security appliance in a computing system, and determine whether the packet is to be processed by a first path or a second path;

in response to determining that the packet is to be processed by the first path, process the packet by a first traffic flow controller of the virtual machine network security appliance, forward the packet by the first traffic flow controller to a first transmitter, and send the packet by the first transmitter; and in response to determining that the packet is to be processed by the second path, process the packet by the first traffic flow controller, forward the packet by the first traffic flow controller to a second traffic flow controller of the virtual machine network security appliance, process the packet by the second traffic flow controller, forward the packet by the second traffic flow controller to a second transmitter, and send the packet by the second transmitter.

14. The non-transitory, machine-readable medium of claim 13, wherein in response to determining that the packet is to be processed by the first path, instructions, when executed, further cause the one or more processing resources to send the packet by the first traffic flow controller to an intrusion prevention service (IPS) processor, and performing IPS processing on the packet by the IPS processor and send the packet to the second transmitter.

15. The non-transitory, machine-readable medium of claim 13, wherein in response to determining that the packet is to be processed by the second path, the instructions, when executed, further cause the one or more processing resources to sending the packet by the second traffic flow controller to an intrusion prevention service (IPS) processor, and performing IPS processing on the packet by the IPS processor and sending the packet to the second transmitter.

16. The non-transitory, machine-readable medium of claim 13, wherein the first traffic flow controller and the second traffic flow controller are executed by different virtual central processing units.

17. An apparatus comprising:

processing circuitry; and instructions that when executed by the processing circuitry cause the apparatus to:

receive a packet, by a virtual machine network security appliance in a computing system, and determine whether the packet is to be processed by a first path or a second path;

in response to determining that the packet is to be processed by the first path, process the packet by a first traffic flow controller of the virtual machine network security appliance, forward the packet by the first traffic flow controller to a first transmitter, and send the packet by the first transmitter; and in response to determining that the packet is to be processed by the second path, process the packet by the first traffic flow controller, forward the packet by the first traffic flow controller to a second traffic flow controller of the virtual machine network security appliance, process the packet by the second traffic flow controller, forward the packet by the second traffic flow controller to a second transmitter, and send the packet by the second transmitter.

18. The apparatus of claim 17, wherein processing of the packet by the first path is faster than processing of the packet by the second path.

19. The apparatus of claim 17, wherein the first traffic flow controller performs firewall processing on the packet.

* * * * *